US010189336B2

(12) United States Patent
Dalmasso et al.

(10) Patent No.: US 10,189,336 B2
(45) Date of Patent: Jan. 29, 2019

(54) GLAZING UNIT COMPRISING A PROFILED CLIP-FASTENING BEAD HAVING A HOLE

(71) Applicant: SAINT-GOBAIN GLASS FRANCE, Courbevoie (FR)

(72) Inventors: Giovanni Dalmasso, Cuneo (IT); Nicola Trombetta, Savigliano (IT)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/550,682

(22) PCT Filed: Feb. 11, 2016

(86) PCT No.: PCT/FR2016/050314
§ 371 (c)(1),
(2) Date: Aug. 11, 2017

(87) PCT Pub. No.: WO2016/128683
PCT Pub. Date: Aug. 18, 2016

(65) Prior Publication Data
US 2018/0029449 A1    Feb. 1, 2018

(30) Foreign Application Priority Data

Feb. 13, 2015    (FR) ...................................... 15 51205

(51) Int. Cl.
*B60J 1/00*    (2006.01)
*B60J 1/02*    (2006.01)
(Continued)

(52) U.S. Cl.
CPC ......... *B60J 1/006* (2013.01); *B32B 17/10036* (2013.01); *B32B 17/10293* (2013.01);
(Continued)

(58) Field of Classification Search
CPC ..... B60J 1/02; B60J 10/35; B60J 10/70; B60J 10/02; B60J 10/0005; B60J 1/006; B60J 1/20
See application file for complete search history.

(56) References Cited

U.S. PATENT DOCUMENTS 8,393,668 B2 *   3/2013   Timmermann .......... B60J 10/35
                                                        296/84.1
8,628,137 B2 *   1/2014   Platt ........................ B60J 10/02
                                                        296/84.1
(Continued)

FOREIGN PATENT DOCUMENTS

CN    102 785 621 A    11/2012
DE    36 06 566 A1     9/1987
(Continued)

OTHER PUBLICATIONS

International Search Report as issued in International Patent Application No. PCT/FR2016/050314, dated Apr. 28, 2016.

*Primary Examiner* — Beth A Stephan
(74) *Attorney, Agent, or Firm* — Pillsbury Winthrop Shaw Pittman, LLP

(57) ABSTRACT

A vehicle glazing unit includes a glazed element having an outer face, an edge face and an inner face, the glazing unit including, along at least a part of a bottom edge, a profiled bead including a groove for clip-fastening a covering piece on the profiled bead, the profiled bead including, as seen in cross section, an inner leg situated beneath the inner face of the glazed element, wherein the inner leg includes, at least in a bottom part of the profiled bead, at least one hole passing through the inner leg, the hole having a length of between 2.0 and 50.0 mm and a width of between 2.0 and 10.0 mm.

10 Claims, 2 Drawing Sheets

(51) Int. Cl.
  *B60J 10/35* (2016.01)
  *B60J 10/70* (2016.01)
  *B32B 17/10* (2006.01)
(52) U.S. Cl.
  CPC ............... *B60J 1/02* (2013.01); *B60J 10/35* (2016.02); *B60J 10/70* (2016.02)

(56) References Cited

U.S. PATENT DOCUMENTS

| | | | | |
|---|---|---|---|---|
| 8,839,589 | B2* | 9/2014 | Erner | B60J 1/02 |
| | | | | 277/637 |
| 9,073,421 | B2* | 7/2015 | Deussen | B60J 10/18 |
| 9,586,465 | B2* | 3/2017 | Sanada | B60J 10/30 |
| 9,694,659 | B2* | 7/2017 | Timmermann | B60J 10/30 |
| 2003/0057660 | A1* | 3/2003 | Ortmuller | B60J 10/18 |
| | | | | 277/628 |
| 2007/0246966 | A1* | 10/2007 | Polke | B60J 10/18 |
| | | | | 296/93 |
| 2011/0115261 | A1* | 5/2011 | Platt | B60J 10/02 |
| | | | | 296/208 |
| 2011/0181071 | A1* | 7/2011 | Schaff | B60J 10/18 |
| | | | | 296/93 |
| 2011/0285177 | A1* | 11/2011 | Flammer | B60J 10/265 |
| | | | | 296/208 |
| 2015/0328963 | A1* | 11/2015 | Lee | B60J 1/005 |
| | | | | 296/192 |

FOREIGN PATENT DOCUMENTS

| | | |
|---|---|---|
| EP | 0 945 296 A1 | 9/1999 |
| WO | WO 01/45974 A1 | 6/2001 |
| WO | WO 01/85481 A1 | 11/2001 |
| WO | WO 2009/112545 A1 | 9/2009 |

* cited by examiner

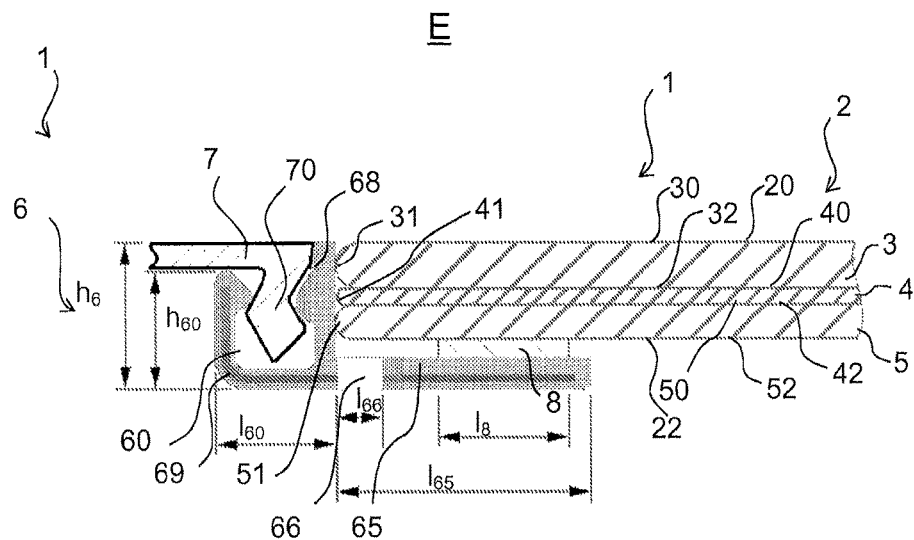

GLAZING UNIT COMPRISING A PROFILED CLIP-FASTENING BEAD HAVING A HOLE

CROSS-REFERENCE TO RELATED APPLICATIONS

This application is the U.S. National Stage of PCT/FR2016/050314, filed Feb. 11, 2016, which in turn claims priority to French patent application number 1551205 filed Feb. 13, 2015. The content of these applications are incorporated herein by reference in their entireties.

The present invention relates to a vehicle glazing unit, and notably a windshield, comprising a glazed element having an outer face, an edge face and an inner face.

The present invention relates more specifically to a vehicle glazing unit which comprises, along at least a part of at least one bottom edge, a profiled bead comprising a groove for clip-fastening a covering piece on said profiled bead, said covering piece comprising, as seen in cross section, a barbed hook that passes into said groove during clip-fastening.

Specifically, in order to position and/or secure a covering piece on a glazed element, it is known practice to use such a profiled bead comprising a groove.

This profiled bead is generally secured to the inner face of the glazed element with the aid of an inner leg which is stuck to this inner face, along at least a part of the bottom edge of the glazing unit.

For good adhesion of this inner leg to the glazed element which allows clip-fastening by force into the groove, this inner leg should be relatively wide (when the profiled bead is viewed in cross section, as is the case in the majority of prior art documents).

Two types of situation are known from the prior art:
  when the covering piece covers at least the groove, protruding above the outer face of the glazed element, as for example in patent applications EP 945 296 and DE 3606566; and
  when the covering piece covers at least the groove without protruding above the outer face of the glazed element, as for example in patent applications WO 2001/045974 or WO 2001/85481.

In the first situation, the covering piece should be sufficiently wide to cover at least the inner leg such that it is not visible from the outside and/or a masking strip is provided farther toward the outside than the inner leg.

In the second situation, a masking strip is provided farther toward the outside than the inner leg so as to cover at least the inner leg such that it is not visible from the outside.

A common factor for these two situations is that when the profiled bead, which is prefabricated, is pressed against the bottom inner edge of the glazing unit in order to be stuck to the latter, it can be difficult to make the shape of the profiled bead, which is relatively rigid, coincide with the bottom edge of the glazing unit.

This is even more difficult when the edge face of this bottom edge of the glazing unit has, in certain locations, a relatively small radius of curvature.

An additional difficulty arises from the fact that, in spite of all of the precautions taken during the series production of the glazed elements, the range of dimensions from one glazed element to another in the same series (the fact that the glazed elements do not all have exactly the same dimensions) can be relatively large while the range of dimensions of the profiled bead is relatively small.

This is particularly the case when the glazed elements are laminated glazed elements; windshields necessarily comprise laminated glazed elements.

Moreover, when the edge face of the bottom edge of a glazing unit has, in certain locations, a relatively small radius of curvature, this means that there are parts of this bottom edge which are raised upward, that is to say are higher than the bottommost point of this bottom edge.

In this case, it may be necessary to wish to provide means for evacuating the water which can pass between the edge face of the glazed element and the groove in the adjacent profiled bead and which can stagnate in one or more bottom parts of the bottom edge which are situated between two high parts of the bottom edge.

The aim of the present invention is to remedy these drawbacks by proposing a glazing unit comprising a profiled bead that allows clip-fastening by force, and thus which is securely attached to the glazed element, while making it possible to adapt more easily to the bottom edge of the glazed element and while making it possible to evacuate more easily the water that may be present.

Therefore, the present invention relates to a vehicle glazing unit, and notably a laminated glazing unit, as claimed in claim 1. This glazing unit comprises a glazed element, which may be laminated and thus comprises an outer glass sheet, an inner glass, sheet and an interlayer sheet of plastics material situated between said two glass sheets (directly in contact or with another sheet of plastics material in between).

This glazed element has an outer face which is oriented toward the outside of said vehicle, an inner face which is oriented toward the inside of said vehicle and an edge face which is situated between these two faces.

Said glazing unit comprises, along at least a part of at least one bottom edge, a profiled bead comprising a groove for clip-fastening a covering piece on said profiled bead, said covering piece comprising, as seen in cross section, a barbed hook that passes into said groove during clip-fastening.

Said profiled bead is situated against said edge face of said glazed element and comprises, as seen in cross section, an inner leg situated beneath said inner face of said glazed element (directly therebeneath or indirectly therebeneath with insertion of an adhesive strip formed by a layer of glue or an adhesive tape). Said profiled bead preferably comprises a single inner leg.

The expression "the profiled bead is situated against said edge face of said glazed element" should be understood as meaning that, as seen in cross section, at least a part of the profiled bead is in contact with at least a part of the edge face of the glazed element, in the knowledge that this edge face of the glazed element can be in several parts over its height, notably when the glazed element is a laminated glazed element made up of several sheets of material.

This glazing unit is noteworthy in that said inner leg comprises, at least in a bottom part of said profiled bead, at least one hole passing through said inner leg, said hole preferably having a length of between 2.0 and 50.0 mm and a width of between 2.0 and 10.0 mm.

In the present document, where reference is made to the high/bottom position, this is with respect to the position of the glazing unit in the opening it is intended to close.

Completely surprisingly, it has thus been found that it is possible to provide at least one hole in the inner leg of the profiled bead in order to give it flexibility in adaptation and that when this hole is positioned in the bottom part of the profiled bead, that is to say in the region of a bottom recess in the profiled bead when the latter is viewed along its length, this makes it possible to slightly modify the curvature of the profiled bead and thus makes it easier to adapt it to the bottom edge of the glazed element, even if the latter does not have exactly the dimensions desired.

The hole according to the invention is not a securing hole for securing the glazing unit; the hole according to the invention is void of solid material.

Moreover, this hole thus allows the evacuation of the water which can otherwise potentially stagnate at this location and be a source of soiling and which can impair the cohesion of the glazed element if it is a laminated glazed element (in particular for the glazing unit washing water).

Said adhesive strip allows the definitive securing of the profiled bead to the glazed element after the possible adjustment of its position with regard to the glazed element, by virtue of the presence of the hole(s).

Preferably, the hole (or each hole) has a rectangular section with a length of between 10.0 and 20.0 mm and a width of between 2.0 and 6.0 mm.

When said glazing unit comprises a single bottom part, said glazing unit comprises a single hole centered lengthwise on a bottommost point of said profiled bead.

When said glazing unit comprises two bottom parts, said glazing unit comprises two holes each centered lengthwise on a bottommost point of said profiled bead.

Said inner leg is preferably produced in one piece with said groove; it is situated in continuation of the inside of the bottom of said groove, outside said groove.

Said hole is preferably situated in line with said groove, outside the latter, that is to say in line with the edge face of the glazed element. The bottom wall of the groove is continuous; it does not comprise a hole; therefore, said hole does not open into said groove.

In one variant, said inner leg comprises a lug which itself comprises a hole.

Preferably, said hole in said profiled bead, as seen in cross section, is situated between said groove and an adhesive strip which is situated on said inner leg.

As seen in cross section, said outer face of said glazed element is preferably free with respect to said groove, and in a first embodiment said groove is preferably flush with said outer face.

The covering piece is a piece intended to be positioned farther toward the outside than the profiled bead, at least partially above the groove in the profiled bead.

The present invention relates furthermore to a profiled bead for a glazing unit according to the invention, said inner leg of the profiled bead comprising, at least in a bottom part of said profiled bead, at least one hole passing through said inner leg, said hole preferably having a length of between 2.0 and 50.0 mm and a width of between 2.0 and 10.0 mm.

Advantageously, the present invention makes it possible to propose a glazing unit with a profiled clip-fastening bead which is reliable, having an element (at least one hole) which makes it possible to adjust the relative position of the profiled bead with regard to the glazed element and also allows the evacuation of the water which could stagnate between the clip-fastening groove and the edge face of the glazed element.

The present invention thus makes it possible to provide a clip-fastening system which is compact while being reliable.

The glazing unit according to the invention is preferably a fixed glazing unit (not able to move when positioned in the opening it is intended to close).

Several embodiments of the present invention will be described below, by way of nonlimiting example, with reference to the appended drawing, in which.

Figure 1:
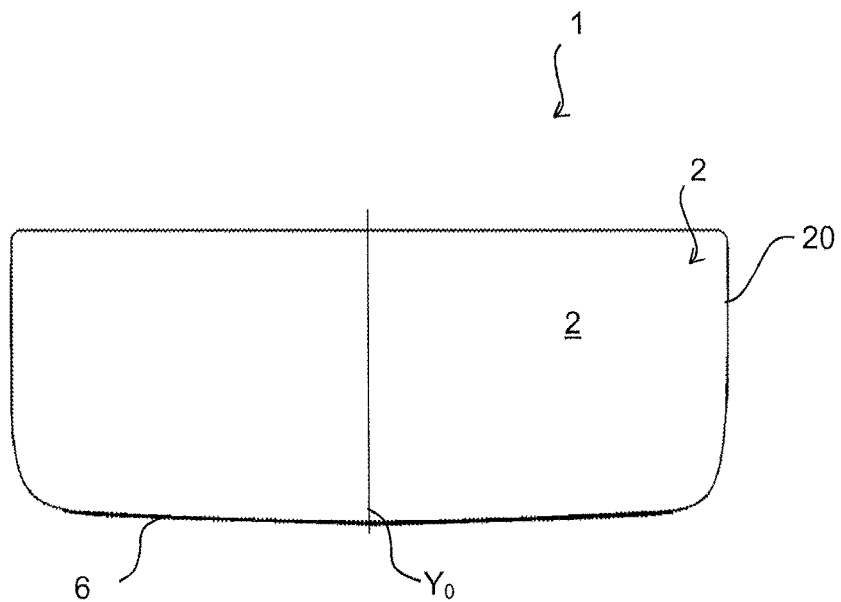
FIG. 1 is a front view of the (outer) face of a vehicle glazing unit according to the invention, comprising, in its bottom part, a profiled bead of which the inner leg has a hole centered longitudinally along the vertical central axis $Y_0$.
Figure 2:
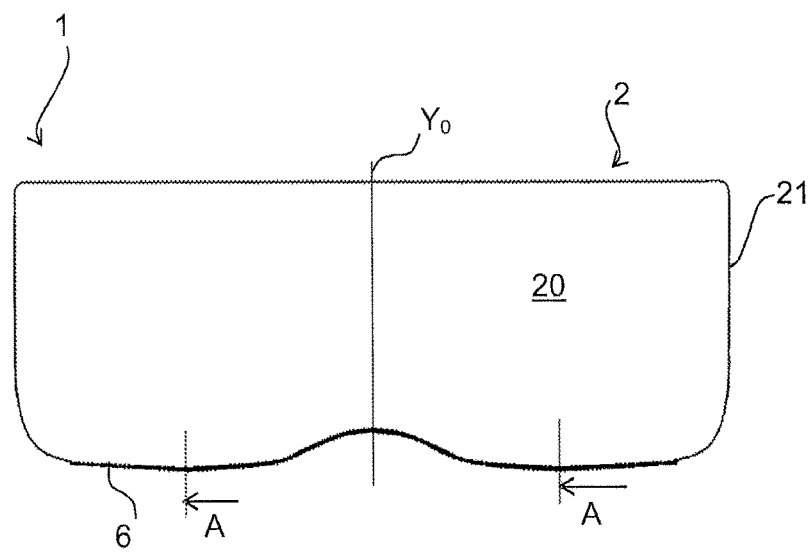
FIG. 2 is a front view of the (outer) face of another vehicle glazing unit according to the invention, comprising, in its bottom part, a profiled bead of which the inner leg has two holes each centered longitudinally, in the bottommost part, along a vertical axis A.

FIG. 3 is a partial cross-sectional view along the axis $Y_0$ or A, respectively, in FIGS. 1 and 2 of a first embodiment of the profiled bead, the covering piece being positioned in continuation of the outer face of the glazed element; and FIG. 4 is a partial cross-sectional view along the axis $Y_0$ or A, respectively, in FIGS. 1 and 2 of a second embodiment of the profiled bead, the covering piece being positioned so as to protrude above the outer face of the glazed element.

Within each figure, the background elements are not generally shown, so as to make it easier to study said figures.

The present invention relates to a fixed vehicle glazing unit 1, as can be seen in FIG. 1 or 2, comprising a glazed element 2.

Since this glazing unit is a vehicle glazing unit, this glazing unit provides a separation between an outside space E which is outside the vehicle and an inside space I which is inside the vehicle. The concepts of "outside" and "inside" are thus considered with respect to this outside space E and this inside space I, respectively.

In FIGS. 1 and 2, the glazing unit is seen from the outside, oriented vertically as on a vehicle.

The glazing unit 1 is intended to close an opening which is formed in a vehicle body.

In the context of the present document, the concept of "centripetal" and that of "centrifugal" should be considered with respect to the central longitudinal axis of forward movement of the vehicle equipped with the glazing unit according to the invention as a windshield, that is to say the axis generally referred to as the "axis X-X'" of the vehicle, which is perpendicular to the plane of the sheet in FIGS. 1 and 2; the centrifugal direction is perpendicular to this axis and in the direction of this axis, while the centripetal direction is perpendicular to this axis and in the opposite direction, moving away from this axis.

In FIG. 1, the bottom edge of the glazed element comprises a single bottom part and a single bottommost point centered along the length of the glazing unit (that is to say the width of the vehicle) on a central vertical axis $Y_0$.

In FIG. 2, the bottom edge of the glazed element comprises two distinct bottom parts that are separated by a high central part which is on a central vertical axis $Y_0$ which is itself centered along the length of the glazing unit (that is to say the width of the vehicle). The two bottom parts are disposed symmetrically on either side of this axis $Y_0$.

Each bottom part is centered lengthwise with respect to a vertical axis A.

The present invention is described in particular when applied to a vehicle windshield and more specifically in the context of application to a lower edge of a vehicle windshield.

Thus, the glazed element 2 is a laminated glazed element which comprises, as can be seen in the cross-sectional views in FIGS. 3 and 4, an outer glass sheet 3, an inner glass sheet 5 and an interlayer sheet of plastics material 4 situated between said two glass sheets.

The glazed element 2 of the glazing unit 1 is a laminated glazing unit which comprises, from outside to inside, at least: the outer glass sheet 3, the interlayer sheet of plastics material 4 and the inner glass sheet 5; however, it is possible for at least one other sheet to be interposed between the outer glass sheet 3 and the interlayer sheet of plastics material 4 or between the interlayer sheet of plastics material 4 and the inner glass sheet 5.

The outer glass sheet 3 has an outer face 30 which is oriented toward the outside E, an interlayer face 32 which is oriented toward the interlayer sheet of plastics material 4, and an edge face 31 situated between these two faces.

The inner glass sheet 5 has an interlayer face 50 which is oriented toward the interlayer sheet of plastics material 4, an inner face 52 which is oriented toward the inside I, and an edge face 51 situated between these two faces.

The interlayer sheet of plastics material 4 has an outer interlayer face 40 which is oriented toward the interlayer face 32 and which is in contact with this interlayer face 32 here, an inner interlayer face 42 which is oriented toward the interlayer face 50 and which is in contact with this interlayer face 50 here, and an edge face 41 which is situated between these two interlayer faces 32, 42.

The glazed element 2 thus has an outer face. 20 realized by the outer face 30 of the outer glass sheet 3, an inner face 22 realized by the inner face 52 of the inner glass sheet 5, and an edge face 21 situated between these two faces, corresponding to the edge face 31 of the outer glass sheet 3, to the edge face 41 of the sheet of plastics material 4 and to the edge face 51 of the inner glass sheet 5, these three edge faces being flush with one another here.

Besides the glazed element 2, the glazing unit 1 comprises, along at least a part of at least one bottom edge, a profiled bead 6 comprising a groove 60 for clip-fastening a covering piece 7 on said profiled bead 6, said covering piece 7 comprising, as seen in cross section, a barbed hook 70 that passes into said grove 60 during clip-fastening.

The groove 60 has a mouth and a bottom wall: during the clip-fastening of the covering piece 7, the barbed hook 70 passes into the groove 60 through the mouth and in the direction of the bottom wall; generally, in the clip-fastened position, the barbed hook 70 does not touch the bottom wall of the groove.

The mouth of the groove, through which the barbed hook 70 is introduced, is realized by two throats: a centrifugal throat 67, situated to the left of the barbed hook 70 in FIGS. 3 and 4, and a centripetal throat 68, situated to the right of the barbed hook 70 in these same figures. These two throats have the purpose of guiding the barbed hook 70 precisely toward the bottom wall of the groove 60 during the clip-fastening of the barbed hook 70.

The covering piece 7 is intended to be positioned farther toward the outside than the profiled bead 6 and to cover it at least in part when the glazing unit 1 is seen from the outside E.

The groove 60 is lateral: the groove 60 in the profiled bead extends along the lower edge of the glazed element, next to the edge face 21 of the glazed element 2 against the entirety of this edge face 21. In absolute terms, the groove 60 could be situated next to only a part of the edge face 21 of the glazed element 2, for example against the edge face 31 but not against the edge face 41 or against the edge face 51.

The mouth of the groove is oriented toward the outside.

The bottom wall of the groove 60 can be situated farther toward the inside than the inner face 22 of the glazed element; this does not hamper the positioning of the glazing unit in the opening in the body since there is room under the inner face 22.

The two throats of the mouth of the groove are each in the form of a hammer with the heads almost opposite one another, the centrifugal throat 67 being situated slightly farther toward the outside than the centripetal throat 68.

The barbed hook is a double hook: it consists, as seen in cross section, of two bosses that are oriented away from one another and in an offset manner, the centrifugal boss, intended to sit under the centrifugal throat 67, being situated slightly farther toward the outside than the centripetal boss, intended to sit under the centripetal throat 68.

Clip-fastening thus consists in passing the barbed hook 70 into the groove 60 and more specifically passing the two bosses of the barbed hook into the groove 60 and under the two throats.

For a correct hold, the width of the mouth, which is smallest between the two throats, is less than the width of the two bosses at the widest.

The material of which the groove 60 is made can be reinforced by the presence, on the inside, of a lug 69, for example a metal insert, which makes it possible to increase the rigidity of the groove. This lug can be for example a profiled element made of aluminum with a thickness of 0.4 mm.

It increases the rigidity of the groove 60.

The profiled bead 6 comprises, as seen in cross section, an inner leg 65 situated beneath said inner face 22 of the glazed element.

Said inner leg 65 is produced in one piece with the groove 60; it is situated close to the bottom wall of the groove, outside the latter, and extends inward and upward.

According to the invention, the inner leg 65 comprises, at least in a bottom part of the profiled bead, at least one hole 66 passing through said inner leg 65. This hole passes right through the leg: it opens both onto an outer surface of the inner leg and onto an inner surface of the inner leg.

The hole 66 is void of solid material and allows the evacuation of the water which would otherwise stagnate on the inner leg 65, between the groove 60 and the edge face 21 of the glazed element: the water can thus pass through the inner leg and flow downward.

In FIGS. 3 and 4, the profiled bead 6 is illustrated in cross section very exactly in a bottom part of this profiled bead, where a hole 6 is situated.

Thus, in conjunction with FIG. 1, the hole 66 in the inner leg is a single hole and is centered lengthwise on a bottommost point of the glazed element, that is to say on the axis $Y_0$. This is also the bottommost point of the profiled bead.

In conjunction with FIG. 2, there are two holes 66 in the inner leg, each one being centered lengthwise on a bottommost point of the glazed element, that is to say on the axis A.

It is possible to add further holes, in particular to promote the evacuation of the water which would otherwise stagnate on the inner leg 65, between the groove 60 and the edge face 21 of the glazed element.

Regardless of the embodiment, the hole 66 preferably has a length of between 2.0 and 50.0 mm and a width $l_{66}$ of between 2.0 and 10.0 mm. These are the dimensions which provide the profiled bead with optimal flexibility and optimal water evacuation capability.

By way of preferred example, the hole 66 can have a rectangular section with a length of between 10.0 and 20.0 mm, notably 15.0 mm, and a width $l_{66}$ of between 2.0 and 6.0 mm, notably 4.0 mm.

The hole 66 is situated in line with the groove 60, outside the latter, that is to say just at the junction between the inner leg 65 and the groove 60.

As seen in cross section, the hole 66 is situated between the groove 60 and an adhesive strip 8 which is situated on said inner leg 65, so as to make it possible to stick the inner leg, and thus the profiled bead, to the inner face 22 of the glazed element.

As seen in cross section, the outer face 20 of the glazed element 2 is preferably free with respect to said groove 60.

The profiled bead 6 is prefabricated: it is produced by extrusion through an extrusion die, and then is curved along its length in order to be shaped to match the overall shape of the bottom part of the glazed element along its length, and then pierced in order to form the hole 66, or each hole 66.

The glazed element 2 is produced before the profiled bead 6 is secured to the glazed element 2, that is to say that the lamination of the glass sheets 3, 5 with the sheet of plastics material so as to form a laminated glazing unit is carried out before the profiled bead 6 is secured to the glazed element 2.

In order to secure the profiled bead 6 to the glazed element 2, it is recommended:
  to position the groove 60 against the edge face 21,
  then to adjust the position of this groove with respect to
    the edge face where the hole 66 is in manually pressing
    the groove 60 against the edge face 21 at this location,
  then to stick the profiled bead to the glazed element 2.

This sticking can be carried out with the aid of an adhesive strip 8 formed by a layer of glue or an adhesive tape and notably a double-sided adhesive tape, which is situated on the outer face of the inner leg.

The inner leg 65 has a width $l_{65}$, illustrated in FIG. 3, of between 5.0 and 20.0 mm, or even between 8.0 and 15.0 mm, notably 12 mm. This width is sufficient to allow a good hold of the inner leg against the inner glass sheet.

In the embodiment illustrated in FIG. 3, the covering piece 7 is intended to be positioned farther toward the outside than the profiled bead 6 and to cover it only in part when the glazing unit 1 is seen from the outside E; the centripetal throat 68 constitutes a lip, the outer face of which is both flush with the outer face 20 of the glazed element and flush with the outer face of the covering piece 7.

The centripetal throat 67 is situated less toward the outside than the centrifugal throat 68 such that when the covering piece 7 is clip-fastened in the groove 60, an outer face of the covering piece 7 is flush with the outer surface 30 of the outer glass sheet 3; the covering piece is flush with the outer glass sheet 3 by way of the profiled bead 6 flush both with the outer face of the glazed element and with the outer face of the covering piece.

In FIG. 3, the profiled bead has an overall height $h_6$ of around 7.8 mm and the groove 60 has a height $h_{60}$ of around 5.5 mm and a width $l_{60}$ of around 5.0 mm.

The lug 69 is flat in the space situated under the inner face 22 and continues inside the material of which the groove 60 is made in the portion of this groove which is away from the portion which is against the edge face 21, so as to further stiffen the inner leg 65.

This lug 69 is passed through by the hole 66 which passes through the inner leg 65.

In the embodiment illustrated in FIG. 4, the covering piece 7 is intended to be positioned farther toward the outside than the profiled bead 6 and to cover it completely when the glazing unit 1 is seen from the outside E. In the context of the application to a bottom edge of a windshield, this is a piece intended to trim the edge of the glazing unit and positioned against the rebate 9 by virtue of the presence of a lip 75. It may be a trim element.

Furthermore, in this second embodiment, the two throats are situated farther toward the outside than the outer face 20 of the glazed element; they are situated above this outer face 20 when the continuation of this face beyond the edge face 31 is considered.

The lower leg 65 is a single leg made of the same material and in one piece with the groove 60, without reinforcement.

One edge of the opening which the glazing unit 1 is intended to close—in this case a lower edge—is illustrated by a rebate 9 in FIG. 4.

FIG. 4 furthermore illustrates an independent variant in which the barbed hook 70 comprises, as seen in cross section, a front stop 72 situated outside said groove 60.

This front stop 72 is centrifugal here and is located against the centrifugal throat 67 during clip-fastening, but it could be centripetal and be located against the centripetal throat 68 during clip-fastening; its purpose is to limit the passing of the barbed hook 70 into the groove 60.

Preferably, as can be seen in FIG. 4, the bottom wall of the groove 60 does not form a symmetrical U, but an asymmetrical U, with a larger radius of curvature on the rebate 9 side, making it possible to reduce the space requirement of the groove with respect to the adjacent rebate.

More specifically, the use of a groove with an asymmetrical bottom wall having a larger radius of curvature on the rebate side makes it possible to increase the inclination of the rebate in its part adjacent to the edge face of the glazed element by an angle of around 20° and thus to decrease the distance between the rebate 9 and the centrifugal bottom wall of the groove, from a value of around 9 mm to a smaller value of around 4.5 mm. This represents a significant space saving and thus makes it possible to render the clip-fastening system more compact and to increase the size of the glazing unit.

In the first and second embodiments, a masking strip (not illustrated) that is situated farther toward the outside than the inner leg and has a width of 20 mm starting from the edge face of the glazed element can make it possible to mask both the inner leg, having the hole 66, and the bead of glue (not illustrated), which is more centripetal than the inner leg, making it possible to secure the glazing unit to the body.

The invention claimed is:

1. A vehicle glazing unit comprising a glazed element having an outer face, an edge face and an inner face, said glazing unit comprising, along at least a part of a bottom edge, a profiled bead attached to said glazed element and comprising a groove for clip-fastening a covering piece on said profiled bead, said covering piece comprising, as seen in cross section, a barbed hook that passes into said groove during clip-fastening, said profiled bead being situated against said edge face of said glazed element, said profiled bead comprising, as seen in cross section, an inner leg situated beneath said inner face of said glazed element, wherein the bottom edge comprises two bottom parts disposed symmetrically on either side of a vertical axis that is centered along a length of the vehicle glazing unit, wherein the inner leg extends along said two bottom parts and comprises (a), in a region of a first of the two bottom parts a first hole void of solid material and passing through said inner leg and (b), in a region of a second of the two bottom parts, a second hole void of solid material and passing through said inner leg, and wherein the first and second holes are each centered lengthwise on a bottommost point of said profiled bead.

2. The glazing unit as claimed in claim 1, wherein said first hole has a rectangular section with a length of between 10.0 and 20.0 mm and a width of between 2.0 and 6.0 mm.

3. The glazing unit as claimed in claim 1, wherein said first hole is situated adjacent to a bottom part of said groove.

4. The glazing unit as claimed in claim 1, wherein said inner leg comprises a lug which itself comprises a hole.

5. The glazing unit as claimed in claim 1, wherein said first hole in said profiled bead, as seen in cross section, is situated between said groove and an adhesive strip which is situated on said inner leg.

6. The glazing unit as claimed in claim 1, wherein, as seen in cross section, said outer face of said glazed element is free with respect to said groove.

7. A profiled bead for a glazing unit as claimed in claim 1, wherein said inner leg comprises the first and second holes passing through said inner leg.

8. The glazing unit as claimed in claim 1, wherein said first hole has a length of between 2.0 and 50.0 mm and a width of between 2.0 and 10.0 mm.

9. The glazing unit as claimed in claim 6, wherein, as seen in cross section, an upper part of said groove is flush with said outer face.

10. The profiled bead as claimed in claim 7, wherein said first hole has a length of between 2.0 and 50.0 mm and a width of between 2.0 and 10.0 mm.

\* \* \* \* \*